L. D. HUGHES.
RESILIENT TIRE.
APPLICATION FILED OCT. 10, 1918.

1,343,172.

Patented June 8, 1920.

INVENTOR
Lawrence D. Hughes
BY

ATTORNEY

UNITED STATES PATENT OFFICE.

LAWRENCE D. HUGHES, OF OKLAHOMA, OKLAHOMA.

RESILIENT TIRE.

1,343,172.  Specification of Letters Patent.  Patented June 8, 1920.

Application filed October 10, 1918. Serial No. 257,650.

*To all whom it may concern:*

Be it known that I, LAWRENCE D. HUGHES, a citizen of the United States, and a resident of the city, county, and State of Oklahoma, have invented new and useful Improvements in Resilient Tires, of which the following is such a clear and exact description as to enable others skilled in the art to which it appertains to make and use the same.

This invention relates to vehicle tires, and especially that type that are mechanically resilient, and of resilient compounded units, to make a practically solid body for the tire, yet providing all the features of a pneumatic tire.

An object of the invention is to make a tire from metallic strands containing the resilient qualities necessary to make a resilient composite tire.

And another object is to seal the tire in its place, in practice.

Other objects of the invention will appear from a further and more complete reading of the following specification.

On the drawings, accompanying and forming a part of this specification,

In the views similar characters of reference indicate similar parts.

Figure 1:
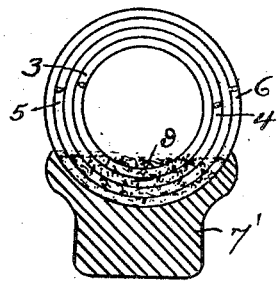
Figure 1 is a sectional view of the tire, felly, and sealing.
Figure 2:
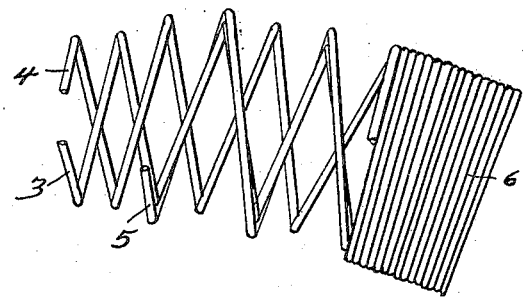
Fig. 2 is a side elevation of a portion of the tire partly broken away.
Figure 3:
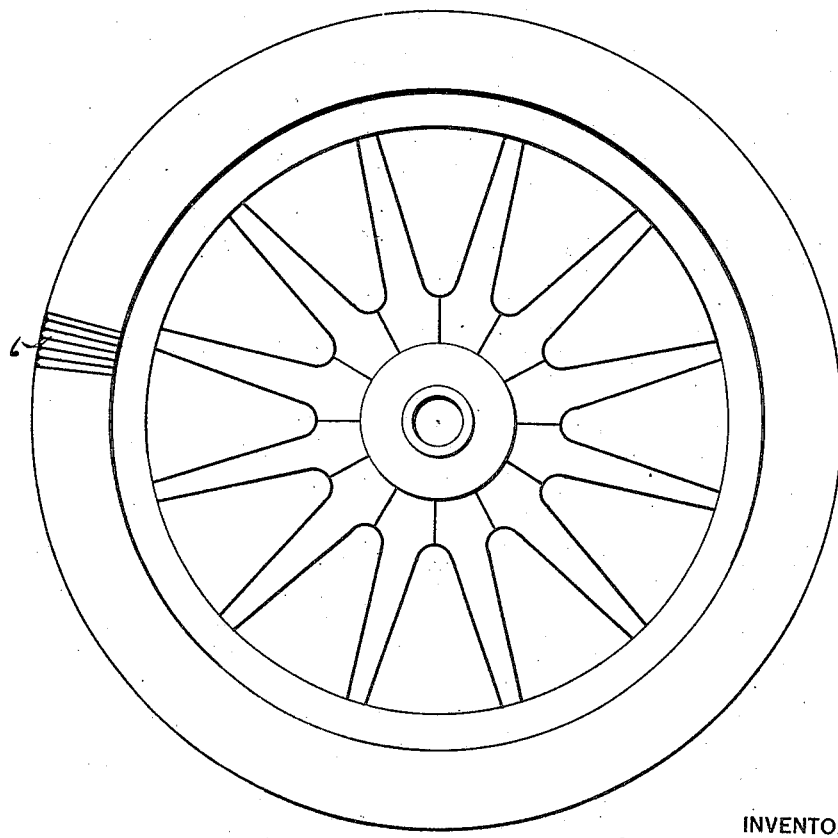
Fig. 3 is an elevational view of the wheel.

The inner strand 3 is the base upon which is convoluted the strand 4 and about it is convoluted the strand 5 these being convoluted in opposed directions to change the strains and thus equalize the structure, formed by the strand building. This building, as for instance, indicated in Fig. 1 may be of two or more strands, according as the necessity of the case may demand.

To this structure is wound a strand 6 forming a tread casing which may or may not support a covering or casing, as the case may be, according to the desire of the manufacturer or user.

The meeting ends of each of these strands may be united in any suitable manner, but in order to make the resilience uniform, it may be found to be advantageous to weld them in any suitable manner, perhaps electrically. And if desired as the convolutions cross each other, in order to stabilize the structure, the entire mass may be welded electrically.

To hold the finished product in the felly, 7' the same may be filled with a suitable cement 9, and that may run through the strands, giving a homogeneous mass or foundation through which the strands extend.

Thus it will be seen that there is provided a tire, efficient and resilient, made up of mechanical elements individually arranged and yet interdependently associated and formed into a unit as a tire.

Having thus described this invention, I claim—

A resilient tire comprising an inner, intermediate and an outer coil spring convoluted one upon another with the convolutions of adjacent springs extending in different directions, and a metallic casing inclosing said coil springs.

Signed at Oklahoma, in the county and State of Oklahoma, this 4th day of October, in the year of our Lord nineteen hundred and eighteen.

LAWRENCE D. HUGHES.